United States Patent
Spaulding

(10) Patent No.: US 10,006,768 B2
(45) Date of Patent: Jun. 26, 2018

(54) LASER LEVEL

(71) Applicant: STANLEY BLACK & DECKER INC., New Britain, CT (US)

(72) Inventor: James Spaulding, Bristol, CT (US)

(73) Assignee: STANLEY BLACK & DECKER INC., New Britain, CT (US)

( * ) Notice: Subject to any disclaimer, the term of this patent is extended or adjusted under 35 U.S.C. 154(b) by 81 days.

(21) Appl. No.: 15/131,148

(22) Filed: Apr. 18, 2016

(65) Prior Publication Data

US 2017/0268877 A1    Sep. 21, 2017

Related U.S. Application Data

(60) Provisional application No. 62/308,490, filed on Mar. 15, 2016.

(51) Int. Cl.
*G01C 15/02*    (2006.01)
*G01C 15/00*    (2006.01)

(52) U.S. Cl.
CPC ......... *G01C 15/002* (2013.01); *G01C 15/004* (2013.01)

(58) Field of Classification Search
CPC ........................... G01C 15/002; G01C 15/004
USPC .................................. 33/286, 290, 291, 292
See application file for complete search history.

(56) References Cited

U.S. PATENT DOCUMENTS

| | | | |
|---|---|---|---|
| 3,801,205 A | 4/1974 | Eggenschwyler | |
| 4,751,782 A | 6/1988 | Ammann | |
| 4,854,703 A | 8/1989 | Ammann | |
| 5,367,779 A | 11/1994 | Lee | |
| 5,500,524 A | 3/1996 | Rando | |
| 5,617,202 A | 4/1997 | Rando | |
| 5,703,718 A * | 12/1997 | Ohtomo | G01C 15/002 |
| | | | 250/225 |
| 5,754,582 A | 5/1998 | Dong | |
| 5,782,003 A | 7/1998 | Bozzo | |
| 5,872,657 A | 2/1999 | Rando | |
| 5,898,490 A * | 4/1999 | Ohtomo | G01C 15/004 |
| | | | 356/141.1 |
| 5,946,087 A | 8/1999 | Kasori et al. | |
| 6,338,681 B1 | 1/2002 | Lin | |
| 6,502,319 B1 | 1/2003 | Goodrich et al. | |
| 6,526,089 B1 | 2/2003 | Haeno et al. | |
| 6,606,798 B2 | 8/2003 | El-Katcha et al. | |
| 6,964,106 B2 | 11/2005 | Sergyeyenko et al. | |

(Continued)

FOREIGN PATENT DOCUMENTS

EP    1235051    8/2002

OTHER PUBLICATIONS

EP Search Report dated Jul. 12, 2017, for EP Application No. 17161138.7.

*Primary Examiner* — G. Bradley Bennett
(74) *Attorney, Agent, or Firm* — Stephen R. Valancius

(57) ABSTRACT

A laser level including a housing. A laser generator assembly is housed in the housing and generates a laser beam. A projector projects the beam from the laser generator outside of the housing onto a target surface. The laser is a rotary laser and the projector rotates to rotate projection of the beam. The laser level also includes protective arms extending from the housing, the protective arms blocking projection of the beam along part of its path as the projector rotates. A width of the beam is at least twenty percent greater than a width of the leg where the beam contacts the leg.

20 Claims, 11 Drawing Sheets

(56) References Cited

U.S. PATENT DOCUMENTS

| | | |
|---|---|---|
| 7,013,571 B2 | 3/2006 | El-Katcha et al. |
| 7,027,480 B2 | 4/2006 | Marshall et al. |
| 7,040,031 B2 | 5/2006 | Chen et al. |
| 7,076,880 B2 | 7/2006 | Sergyeyenko et al. |
| 7,111,406 B2 | 9/2006 | Sergyeyenko et al. |
| 7,116,697 B1 | 10/2006 | Dong |
| 7,287,336 B1 | 10/2007 | Goodrich |
| 7,296,360 B2 | 11/2007 | El-Katcha et al. |
| 7,481,002 B2 | 1/2009 | Bascom et al. |
| 7,497,019 B2 | 3/2009 | Nash et al. |
| 7,520,062 B2 | 4/2009 | Munroe et al. |
| 7,571,546 B1 | 8/2009 | Sergyeyenko et al. |
| 7,665,217 B2 | 2/2010 | Huang |
| 7,966,739 B2 | 6/2011 | Kamizono et al. |
| 8,407,904 B2 | 4/2013 | Hayashi et al. |
| 8,640,350 B2 | 2/2014 | Bascom et al. |
| 2002/0005944 A1* | 1/2002 | Pratt .................. G01C 15/002 356/152.1 |
| 2010/0031520 A1* | 2/2010 | Stefan ................ G01C 15/002 33/290 |
| 2010/0313433 A1* | 12/2010 | Hayashi .............. G01C 15/004 33/291 |
| 2013/0301271 A1 | 11/2013 | Bittner et al. |
| 2014/0202011 A1* | 7/2014 | Munroe ................ G01B 11/26 33/228 |
| 2014/0203172 A1 | 7/2014 | Munroe et al. |
| 2016/0290801 A1* | 10/2016 | Horky ................. G01C 15/002 |
| 2017/0102238 A1* | 4/2017 | Lee ..................... G01C 15/002 |

\* cited by examiner

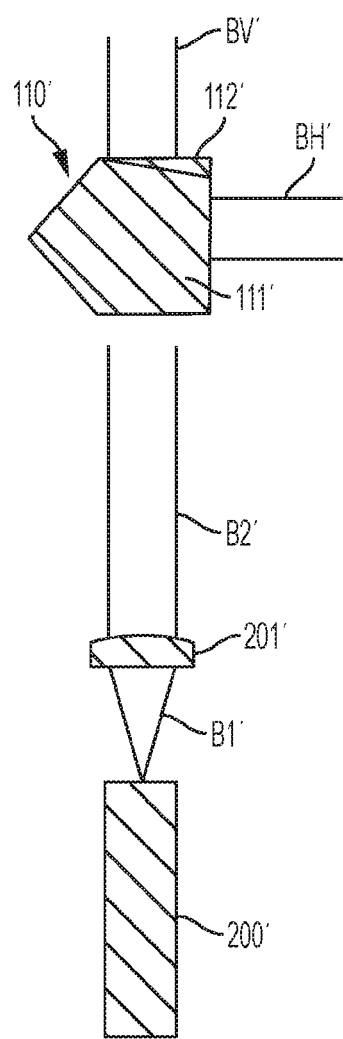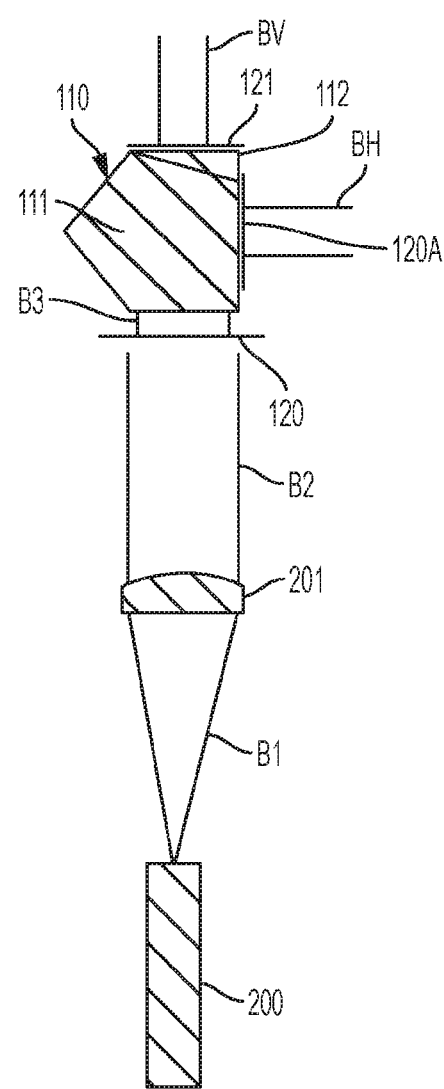
FIG. 3A
FIG. 3B

LASER LEVEL

CROSS-REFERENCE TO RELATED APPLICATIONS

This application claims the benefit of U.S. Provisional Application No. 62/308,490 filed on Mar. 15, 2016, entitled Laser Level. The entire contents of U.S. Provisional Application No. 62/308,490 are incorporated herein by reference.

FIELD OF THE INVENTION

The present invention relates to laser levels.

BACKGROUND

There are various existing laser levels. It is desired to provide a laser level with an improved output.

SUMMARY

According to an aspect of an exemplary embodiment, there is a laser level. The laser includes a housing. A laser generator assembly is housed in the housing and generates a laser beam. The laser level further includes a projector configured to project the beam from the laser generator outside of the housing onto a target surface. The laser is a rotary laser and the projector rotates to rotate projection of the beam. The laser level also includes at least one protective leg extending from the housing, the protective leg blocking projection of the beam along part of its path as the projector rotates. A width of the beam is at least 10% greater than a width of the at least one protective leg where the beam contacts the at least one protective leg.

The at least one protective leg may include two protective legs and the width of the beam is at least 20% greater than the width of each of the two protective legs where the beam contacts the two protective legs.

The width of the beam may be at least 30% greater than the width of the at least one protective leg.

The width of the beam may be at least 50% greater than the width of the at least one protective leg.

The laser beam may have a perpendicular cross section which is a cross section taken perpendicular to an axis of the laser beam, the perpendicular cross section having a first dimension and a second dimension perpendicular to the first dimension, the first dimension of the cross section being at least 20% larger than the second dimension.

The first dimension of the cross section may be at least 35% larger than the second dimension.

The first dimension of the cross section may be at least 50% larger than the second dimension.

The first dimension of the cross section may be at least 75% larger than the second dimension.

According to another aspect of an exemplary embodiment, there is a laser level with a housing. A laser generator assembly is housed in the housing and generates a laser beam. A projector is configured to project the beam from the laser generator outside of the housing. The laser further includes a motor, the motor connected to the projector and selectively driving the projector in a rotary motion whereby the beam is rotated. The laser level further includes protective legs which protect the projector and are situated between the projector and a target surface along part of a path of the beam as the projector is rotated. A width of the beam is greater than a width of the leg where the beam contacts the leg.

The width of the beam may be at least 10% greater than the width of the leg.

The width of the beam may be at least 30% greater than the width of the leg.

The width of the beam may be at least 50% greater than the width of the leg.

The laser beam may have a cross section with a first dimension and a second dimension perpendicular to the first dimension, the first dimension of the cross section being at least 20% larger than the second dimension.

The first dimension of the cross section may be at least 50% larger than the second dimension.

According to another aspect of an exemplary embodiment, there is a laser level which includes a housing. A laser generator assembly is housed in the housing and generates a laser beam. The laser level includes a projector configured to project the beam from the laser generator outside of the housing. The laser level also includes a motor, the motor connected to the projector and selectively driving the projector in a rotary motion whereby the beam is rotated. Protective legs protect the projector and are situated between the projector and a target surface along part of a path of the beam as the projector is rotated. The laser beam has a perpendicular cross section which is a cross section taken perpendicular to an axis of the laser beam, the perpendicular cross section having a first dimension and a second dimension perpendicular to the first dimension, the first dimension of the cross section being at least 20% larger than the second dimension.

The first dimension may be at least 35% larger than the second dimension.

The first dimension may be at least 50% larger than the second dimension.

The first dimension may be at least 75% larger than the second dimension.

The protective legs may include two protective legs and a width of the beam may be at least 20% greater than a width of the two protective legs where the beam contacts the two protective legs.

The protective legs may include three protective legs and a width of the beam may be at least 30% greater than a width of the three protective legs where the beam contacts the three protective legs.

BRIEF DESCRIPTION OF THE DRAWINGS

FIG. 3A is a schematic view of a comparative example of a laser assembly for a laser level;

FIG. 3B is a schematic view of an exemplary embodiment of a laser assembly for the laser level;

DETAILED DESCRIPTION OF EXEMPLARY EMBODIMENTS

Figure 1:
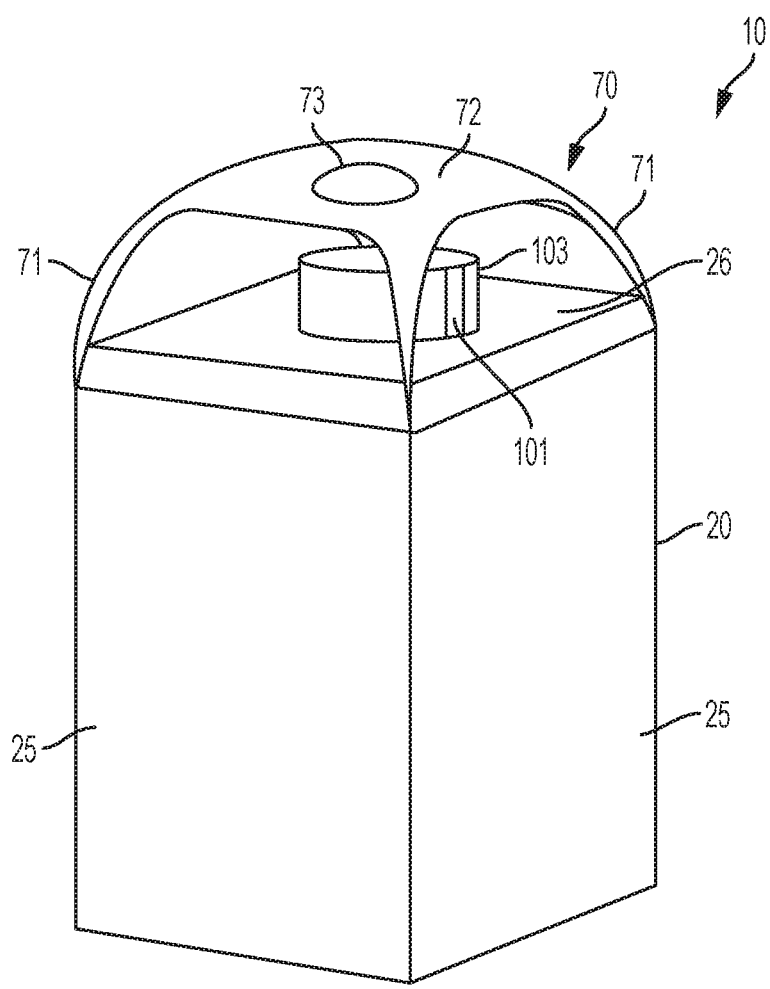
FIG. 1 illustrates a perspective view of an exemplary embodiment of a laser level.
Figure 2:
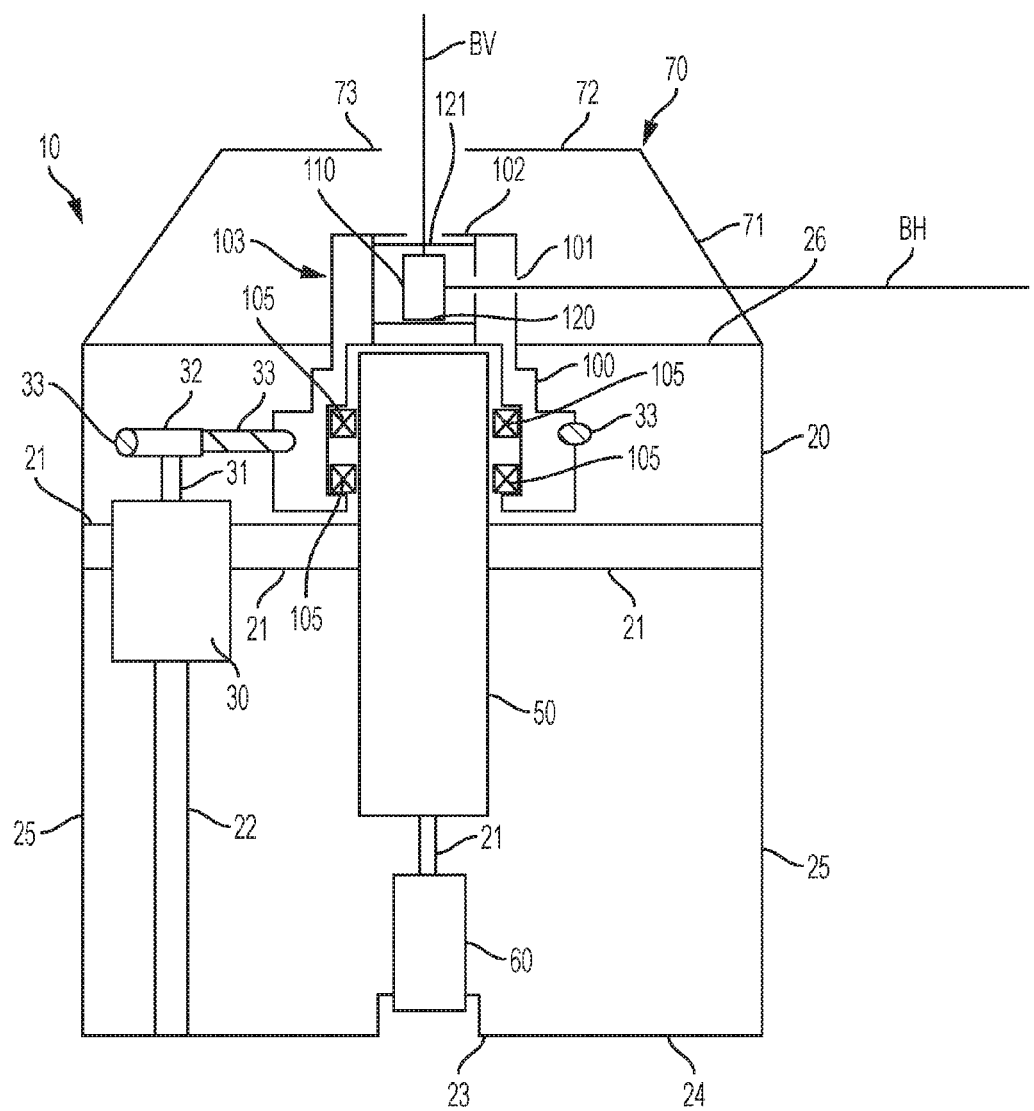
FIG. 2 is cut-away sectional view of the exemplary embodiment of the laser level.

A first exemplary embodiment according to the present application is shown in FIGS. 1-7B. As shown in FIGS. 1 and 2 there is a rotary laser level 10. Rotary laser levels are known, for example, as shown in U.S. Pat. Nos. 4,854,703; 4,751,782; and 6,338,681, which are herein incorporated by reference in their entirety. Another rotary laser level is shown in US Patent Application Publication No. 2014/0203172, which is also hereby incorporated by reference. The present application may also be applicable to other types of lasers, such as those shown in U.S. Pat. Nos. 7,665,217; 7,076,880; 6,964,106; 7,481,002; 7,027,480; 8,640,350; 6,606,798; 7,013,571; 7,111,406; 7,296,360; and 7,571,546, which are herein incorporated by reference in their entirety.

In rotary laser levels, such as the rotary laser level 10 of the exemplary embodiment, the laser level projects a laser beam against a surface. Additionally the laser beam is quickly rotated about 360 degrees. Rotating the laser beam in this manner creates a line on a target surface such as a wall.

FIG. 1 is a perspective view of the rotary laser level 10 and FIG. 2 illustrates a cross-section of the rotary laser level 10 to show internal parts. As shown in FIGS. 1 and 2, the rotary laser level 10 includes a housing 20 which is generally shaped as a rectangular cube. The housing 20 includes a bottom 24, sides 25 and a top 26. An exposed projector 103 extends from the top 26 of the housing 20. The projector 103 includes a hole 101 through which a laser beam can be projected. The beam will generally be projected parallel to the surface on which the housing 20 is disposed. The projector 103 rotates 360 degrees so that the projected beam produces a line.

The laser level 10 also includes a protective structure 70. The protective structure 70 extends from a top 26 of the housing 20 and provides a measure of protection for the projector 103 against falls or the like. The protective structure 70 includes a number of legs 71 and a roof 72. The roof 72 includes a hole 73, so that the projector 103 may project a beam upwardly through the hole 73. In the exemplary embodiment, the protective structure 70 includes four legs 71, one at each corner of the housing 20 (one of the legs is hidden in the perspective view). As will be appreciated, the legs 71 will block the projected beam as the rotated beams passes through the legs 71. Because the beam is blocked by the legs 71, there are several discontinuities in the line which is projected on the wall.

On the one hand, it may be advantageous to provide a protective structure with protective legs so as to protect the projector of a laser level. It may also be advantageous for the legs to have a width that allows them to be robust and adequately protect the projector. However, as noted above, the legs present a discontinuity and legs of a larger width may provide a larger discontinuity. The exemplary embodiment of the present application limits the discontinuities introduced by the blocking of such protective structures including when legs of various widths are used.

The general layout of the rotary laser 10 is shown in FIG. 2. As shown in FIG. 2, a motor 30 is housed in the housing 20. The motor 30 is supported in the housing 20 by supporting structures 21 and 22. These supporting structures 21, 22 hold the motor 30 in place. The motor 30 includes an output shaft 31 which drives a driving pulley 32. The driving pulley 32, in turn, drives belt 33. The belt 33 is connected to the projector housing 100. The projector housing 100 is fitted onto a laser tube 50 via bearings 105. The projector housing is fixed in an axial direction, but is able to rotate about the laser tube 50 via the bearings 105. Accordingly, when the motor 30 is operated, it turns the output shaft 31, which turns the driving pulley 32. The driving pulley 32 drives the belt 33 which rotates the projector housing 100 and the components contained therein. In this manner, the projector 103 is rotated about 360 degrees so that the projected beam forms a line. In this case, the projector 103 is driven by a belt drive. As will be appreciated, other configurations are possible. For example, the motor 30 could be coupled to drive the projector housing 100 by a gear drive.

Figure 3C:
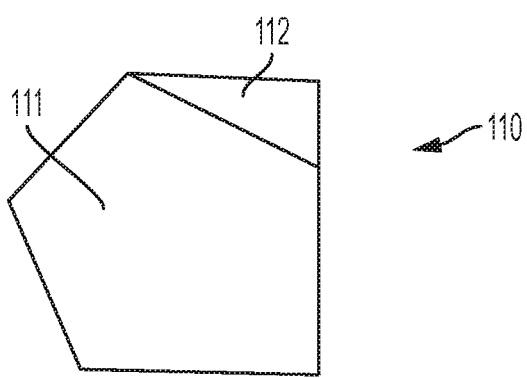
FIG. 3C illustrates the prism of the exemplary embodiment.

The laser tube 50 supports a laser generator 200 and a lens 201 (see FIG. 3B). The laser tube 50 is supported on the housing 20 by supports 21. The laser generator 200 may be, for example, a laser diode. As is further seen in FIG. 2, the laser 10 also includes a lower laser tube 60. The lower laser tube 60 includes another laser generator (not shown) which projects a laser beam downward through opening 23 in the bottom 24 of the housing 20. This creates a plumb beam. A prism 110 is located above the laser tube 50. As will be discussed in greater detail later, the prism 110 divides a beam from the laser generator 200 to produce a horizontal beam BH which is projected out of the laser projector at opening 101 and a vertical beam BV which is projected out of the laser projector at opening 102. As shown in FIGS. 3A-3C, the prism 110 includes a pentaprism 111 and a wedge portion 112. The masks 120 and 121 are also supported in the projector housing 100 and help to shape beams, as will be discussed in more detail below.

The beam BH is a horizontal beam and beam BV is a vertical beam when bottom surface 24 is placed on a flat horizontal surface. In some instances, at least some of the components such as the laser generator 200, lens 201 and prism 110 or the projector housing or the projector housing and laser tube 50 may be on a pendulum so that the beam BH remains horizontal when the bottom surface 24 of the housing 20 is placed on a surface that is not level. Also, the pendulum may be selectively locked. As will be appreciated, the beam BH will not be horizontal when the housing 20 is placed on one its sides 25 or if a pendulum is locked and the housing is placed on a sloped surface.

Figure 4A:
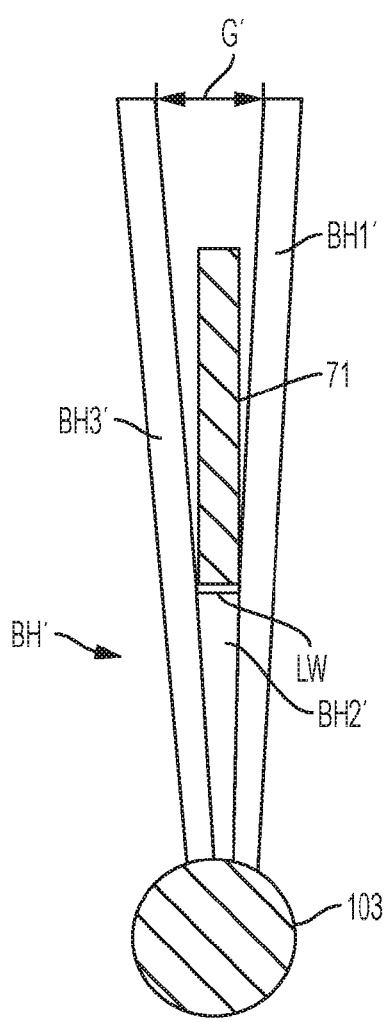
FIG. 4A is a schematic view of a comparative example of a projecting laser beam for a laser level.
Figure 4B:
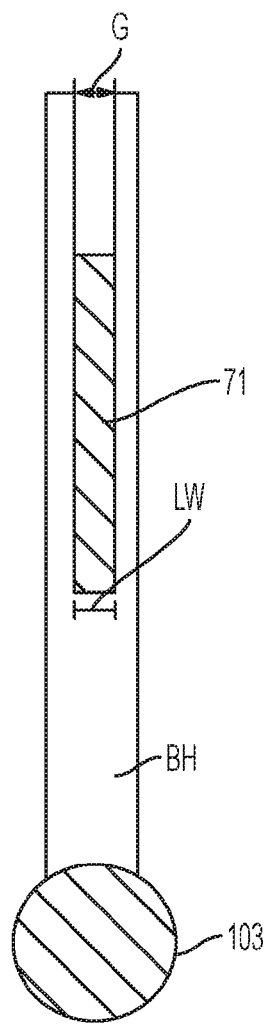
FIG. 4B is a schematic view of an exemplary embodiment of a projecting laser beam for the exemplary embodiment of the laser level.

Operation of the laser of the exemplary embodiment and a comparative example will now be explained with reference to FIGS. 3A-4B. FIGS. 3A and 4A illustrate a comparative example and FIGS. 3B and 4B illustrate the exemplary embodiment. Both the comparative example of FIGS. 3A and 4A and the exemplary embodiment of FIGS. 3B and 4B are used with the laser level 10 described and shown with respect to FIGS. 1 and 2, though in the comparative example (FIGS. 3A and 4A) the later described masks 120 and 121 are not necessary. In FIG. 3A, a laser generator 200' generates a laser beam B1' with non-parallel light beams. The laser beam B1' travels through lens 201' which focuses the beam B1' into parallel rays to produce beam B2'. Beam B2' has the cross-section of a circular dot (the cross-section being perpendicular to an axis of the beam B2'). In this case, the diameter of the circular dot cross-section is 4 millimeters (mm).

The parallel ray beam B2' continues on to prism 110', which includes a pentaprism 111' and a wedge portion 112, and the beam B2' is split into a vertical beam BV' and a horizontal beam BH'. In order to split the beam B2, the pentaprism 111' reflects about 90% of the beam about the surfaces of the pentaprism 111' and out the front face as BH'. The remaining 10% of the beam travels through the pentaprism 111', the trajectory of this 10% is slightly altered by the pentaprism 111' and the wedge portion 112' corrects the beam back to a vertical orientation. When utilized in the laser level 10 of the exemplary embodiment, the comparative example vertical beam BV' projects through opening 73 to form a dot on a ceiling. The horizontal beam BH' travels horizontally from the laser level 10 when the laser level 10 is placed on a flat surface, as discussed above. As can be appreciated, the horizontal beam BH' will generally project between legs 71, but will periodically be blocked by one of the legs 71. This creates a discontinuity in the line that is projected by the horizontal beam BH' on a target surface such as a wall, as is illustrated in FIG. 4A.

FIG. 4A illustrates the gap G' created by leg 71 in the comparative example. FIG. 4A illustrates a beam BH' projecting from the projector 103' at three different points in time as it is rotated. The beam BH' at the three different points in time are identified as BH1', BH2' and BH3'. The beam BH1' is shown at a point just before it reaches the leg 71. Beam BH2' is shown at a point where the beam BH' directly hits leg 71. Beam BH3' is shown passing at a point right after the beam BH' passes past the leg 71. As shown, because the beam BH' is blocked at position BH2', a gap G' is created between the projections BH1' and BH3'. The gap G' increases in size as the beams travel away from the projector 103, as is shown in FIG. 4A. In the comparative example, with a leg 71 having a width LW of 4 mm and the beam BH' having a diameter of 4 mm, the inventors for the present application found that a gap G' of 2 feet was created at a distance of 100 feet from the projector 103.

In the exemplary embodiment of the present application shown by FIGS. 3B and 4B, a laser beam with an expanded cross section is used to help minimize the gap created by the leg 71 of the protective structure 70. As shown in FIG. 3B, laser generator 200 generates a laser beam B1 with non-parallel light beams. The laser beam B1 travels through lens 201 which focuses the beam B1 into parallel rays to produce beam B2. As with the comparative example beam B2' of FIG. 3A, the beam B2 has a cross-section of a circular dot. However, the beam B2 has a diameter of eight (8) millimeters (mm), which is twice the diameter of the beam B2'. In the exemplary embodiment, the larger cross section is created by having the laser generator 200 farther away from the lens 201 than the laser generator 200' and lens 201' of the comparative example. The lens 201 is also larger than the lens 201'. It is also possible to create a larger diameter beam in different ways. All of the discussed beam cross-sections being taken perpendicular to an axis of the beam.

Figure 5A:
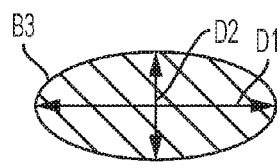
FIG. 5A is a cross section of an exemplary embodiment of a laser beam.
Figure 5B:
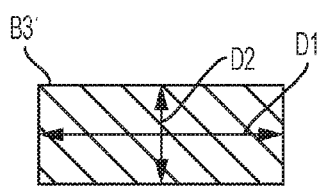
FIG. 5B is a cross section of another exemplary embodiment of a laser beam.
Figure 5C:
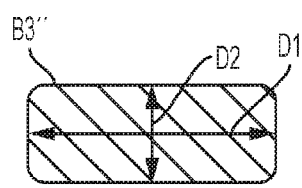
FIG. 5C is a cross section of another exemplary embodiment of a laser beam.
Figure 6A:
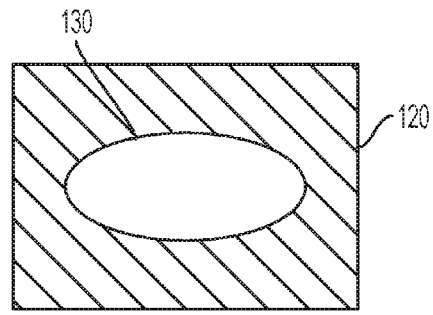
FIG. 6A is an exemplary embodiment of a mask.
Figure 6B:
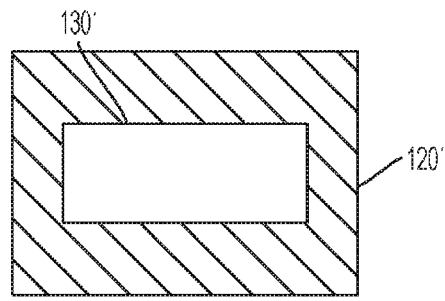
FIG. 6B is another exemplary embodiment of a mask.
Figure 6C:
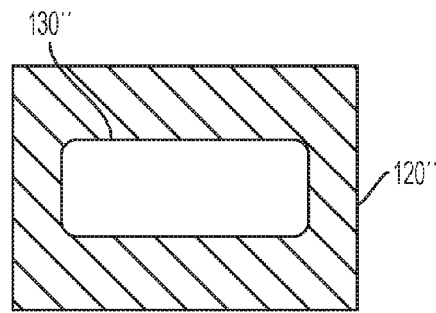
FIG. 6C is another exemplary embodiment of a mask.

As shown in FIG. 3B, the parallel ray beam B2 continues on towards the prism 110. However, before reaching the prism, beam B2 passes through a mask 120 to create a beam B3. The mask 120 blocks part of the beam B2 so that beam B3 no longer has a circular cross section, but instead has a first dimension D1 which is larger than a second dimension D2 that is perpendicular to the first dimension D1. Several exemplary masks are shown in FIGS. 6A through 6C with the corresponding cross sections of beam B3-B3" being shown in FIGS. 5A through 5C. As shown in FIG. 5A, the mask 120 may have an opening 130 that has an elliptical shape. The elliptical shape opening 130 would create a beam B3 with an elliptical cross section, as shown in FIG. 5A. The opening 130 may be, for example, a hole in the mask or a transparent portion which allows the beam to pass through it.

There are also other possibilities for the shape of the mask and the resultant beam. FIGS. 6B and 6C, for example, show alternatives for a mask. The mask 120' of FIG. 6B includes a rectangular shaped opening 130'. Accordingly, as shown in FIG. 5B, it produces a beam B3' with a rectangular cross-section. The mask 120" of FIG. 6C includes an opening 130" with the shape of a rectangle with rounded corners (a rounded rectangle). Accordingly, as shown in FIG. 5C, it produces a beam B3" with a rounded rectangular cross-section. As will be appreciated, other masks and shapes are also contemplated. Additionally, the masks may be disposed at different locations. For example, with reference to FIG. 3B, mask 120A could be substituted for mask 120 and located at the outlet of pentaprism 111.

As shown in FIGS. 5A-5C, the cross-sections of beams B3-B3" include a first dimension D1 and a second dimension D2 which is perpendicular to D1. As shown, the first dimension D1 is larger than the second dimension D2. The first dimension D1 may be greater than the second dimension D2 by, for example, 20% or more; 30% or more; 40% or more; 50% or more; 60% or more; 70% or more; 80% or more; 90% or more; 100% or more; or 150% or more. In the particular exemplary embodiment, the dimension D1 of beam B3 is twice as large as the dimension D2. Particularly, the dimension D1 is approximately 8 mm versus a length of 4 mm for the dimension D2.

Figure 7A:
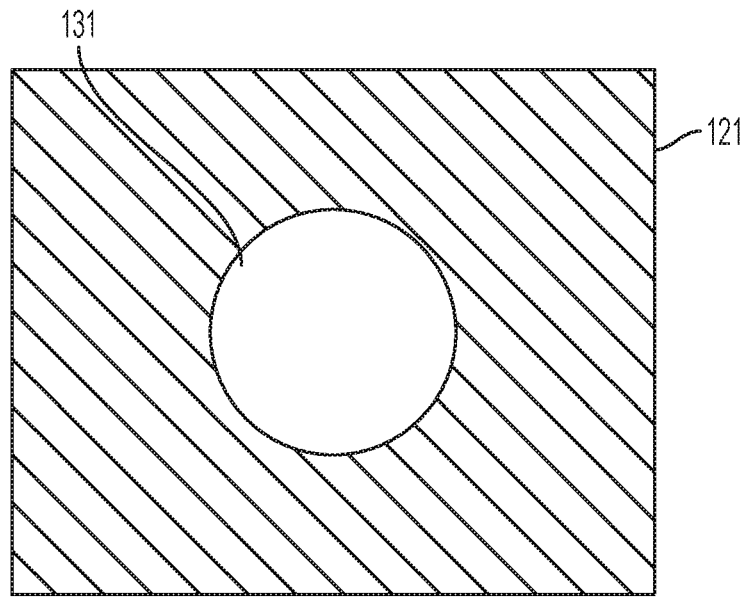
FIG. 7A is an exemplary embodiment of another mask.
Figure 7B:
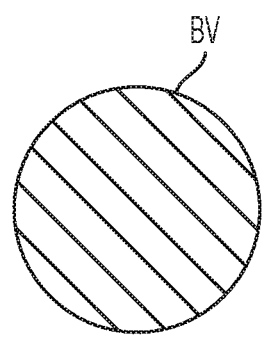
FIG. 7B is an exemplary embodiment of a cross section of a laser beam.
Figure 8A:
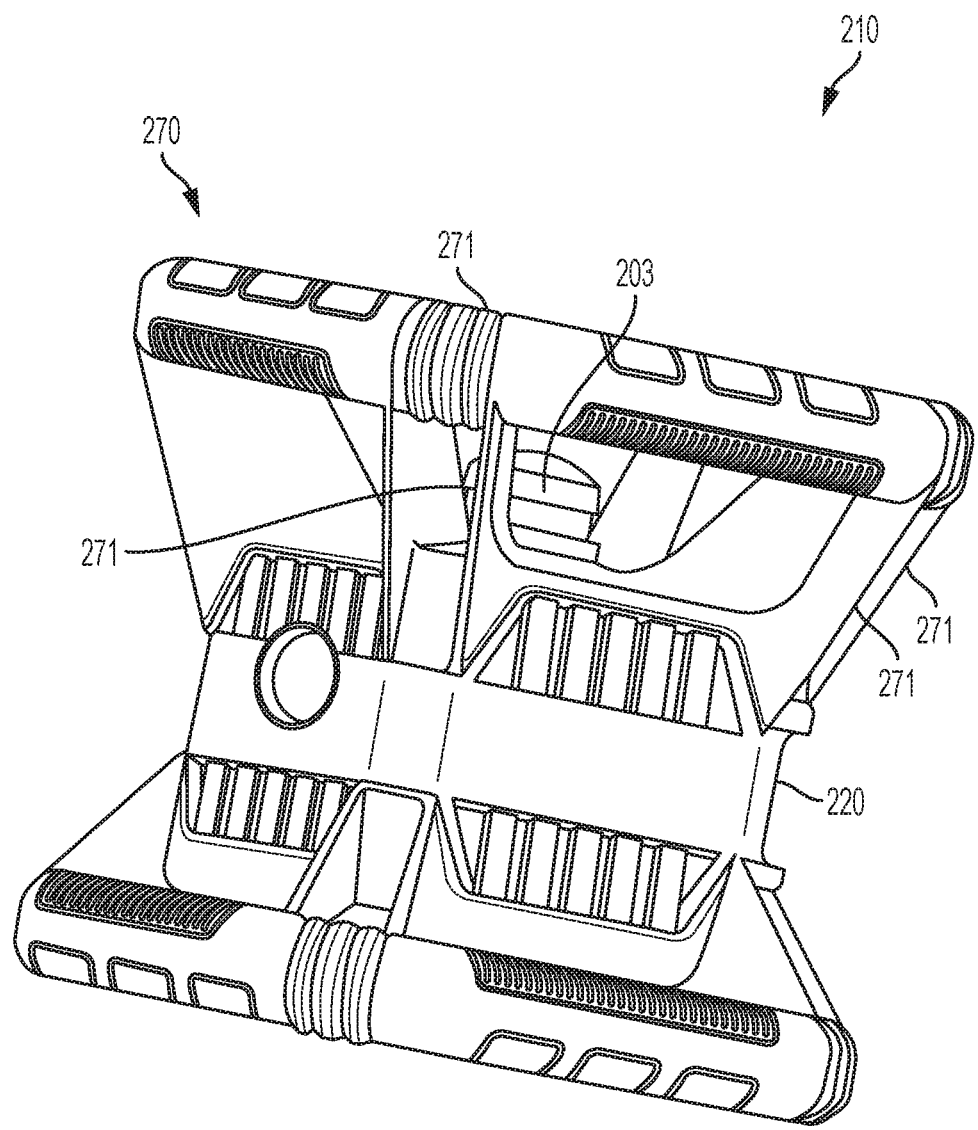
FIG. 8A is perspective view of another exemplary embodiment of a laser level.
Figure 8B:
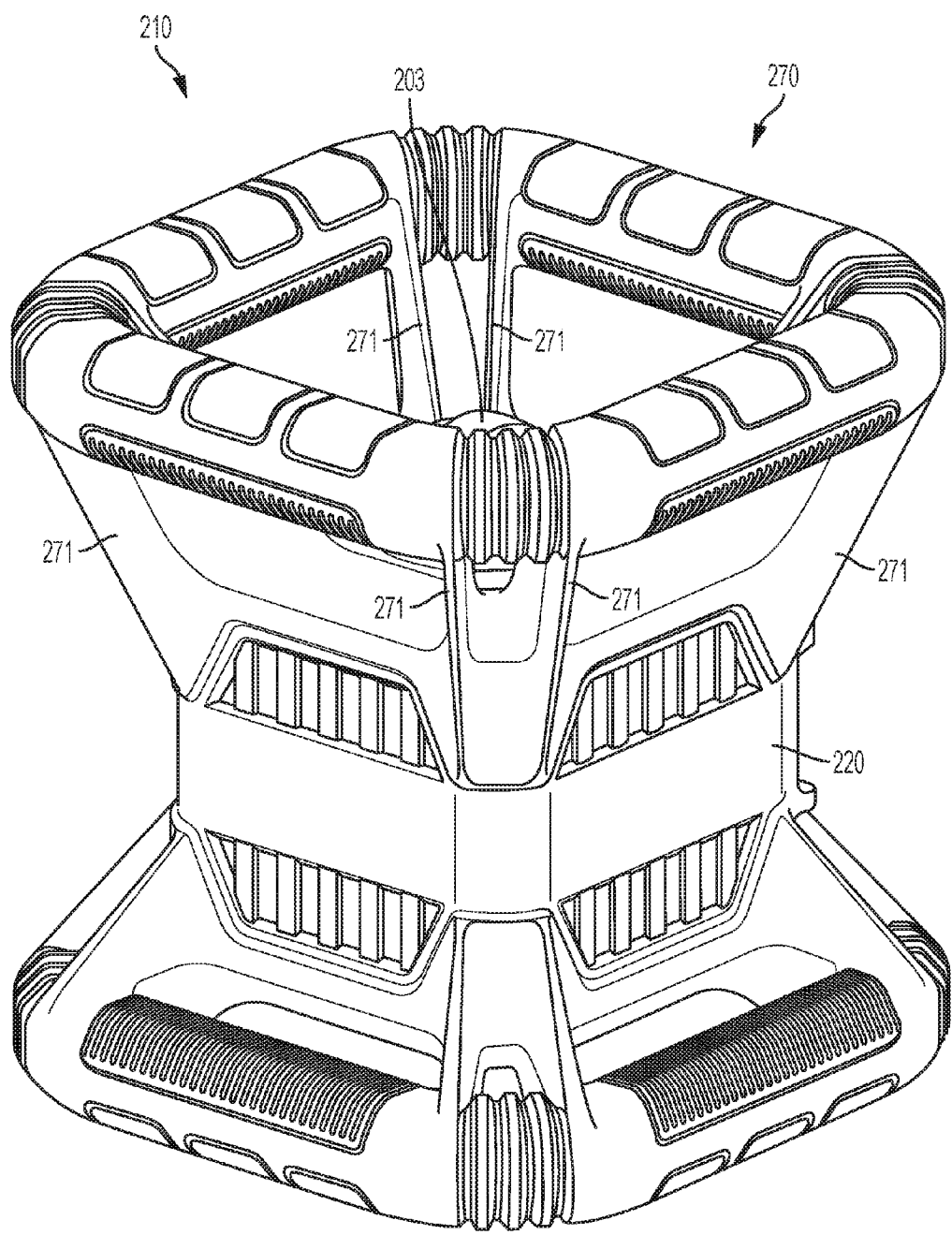
FIG. 8B is another perspective view of the exemplary embodiment of a laser level of FIG. 8A.
Figure 8C:
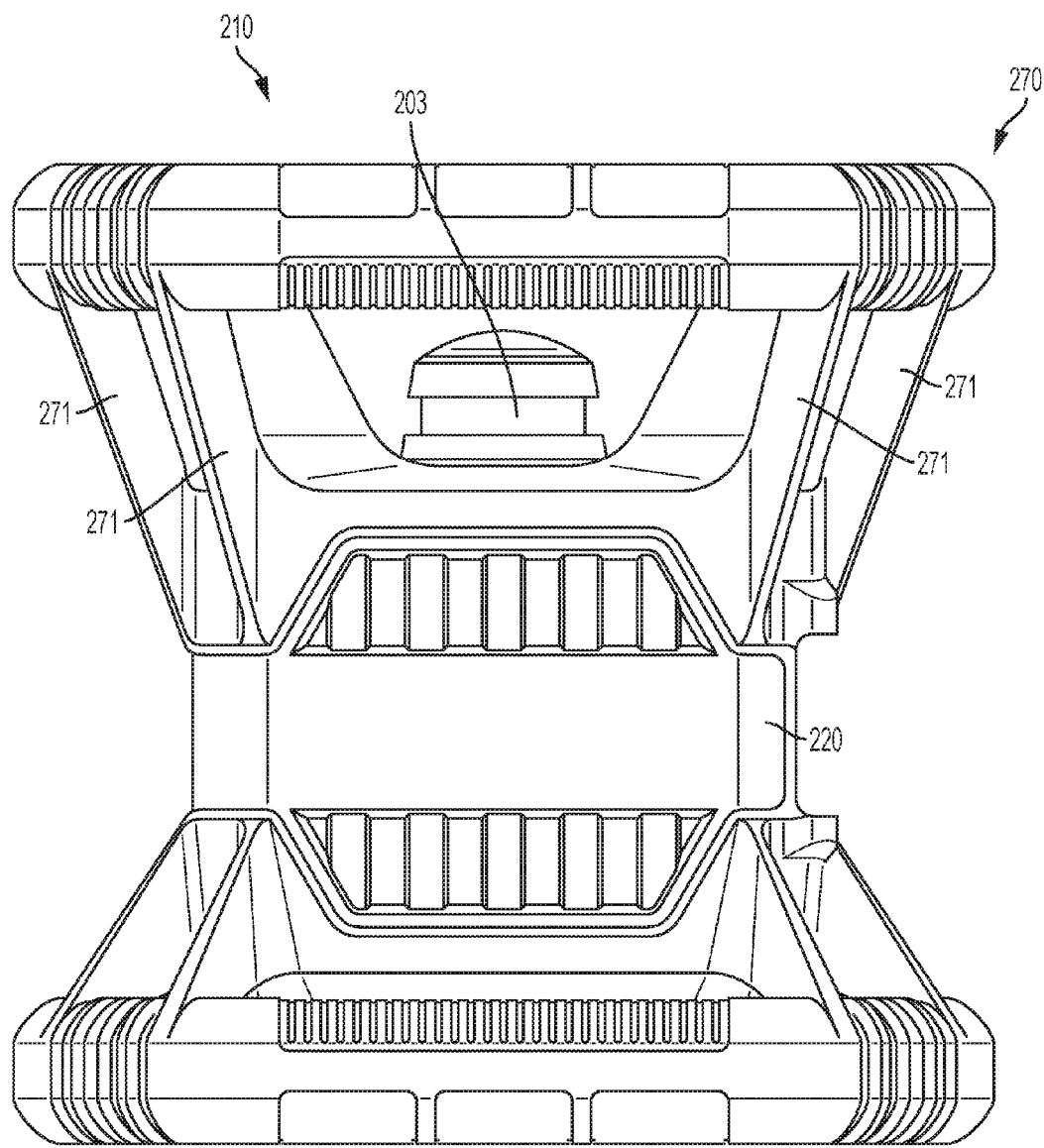
FIG. 8C is side view of the exemplary embodiment of a laser level of FIG. 8A.
Figure 9:
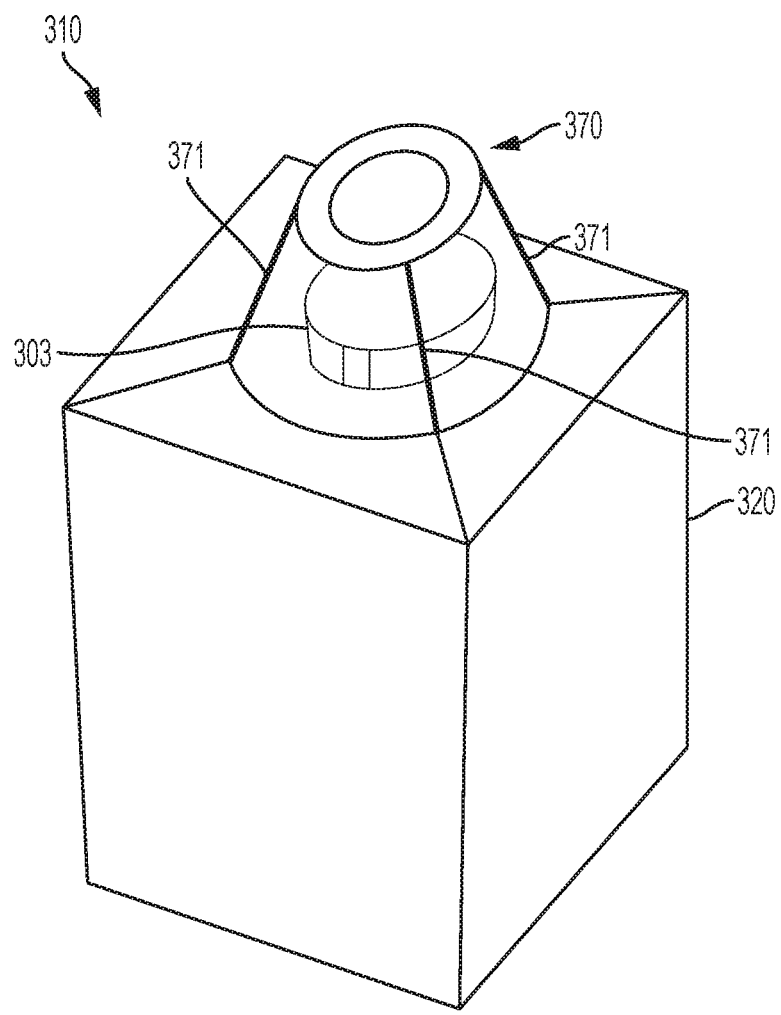
FIG. 9 is perspective view of another exemplary embodiment of a laser level.

Turning back to FIG. 3B, the beam B3 enters the prism 110, which includes a pentaprism 111 and a wedge portion 112. The prism 110 divides the beam B3 into a vertical beam BV and a horizontal beam BH. In order to split the beam B2, the pentaprism 111 reflects about 90% of the beam about the surfaces of the pentaprism 111 and out the front face as BH. The remaining 10% of the beam travels through the pentaprism 111 and the wedge portion 112 corrects the beam back to a vertical orientation. The horizontal beam BH travels horizontally from the laser at least when the laser level 10 is placed on a flat horizontal surface. As can be appreciated, the horizontal beam BH will generally project between legs 71, but will periodically be blocked by one of the legs 71, creating the previously discussed discontinuity. However, due to the shaping of the beam with the mask 120, the horizontal beam BH creates a smaller gap G than the gap G' caused by the beam BH' at similar distances. As with the comparative example of FIGS. 3A and 4A, the vertical beam BV projects through opening 73 to form a dot on a ceiling. However, after leaving the prism 110 in the exemplary embodiment of FIG. 3B, the beam passes through another mask 121. The mask 121 has a circular hole 131 as shown in FIG. 7A, which produces a vertical beam BV with a circular cross section as shown in FIG. 7B. In the exemplary embodiment, the circular cross section of BV has a diameter of approximately 4 mm. As will be appreciated, other diameters and shapes are possible.

With reference to FIG. 4B, the projector 103 projects out a beam BH. The beam BH has the same cross section as the beam B3 as beam B3 is beam BH redirected by the prism 100. As previously discussed, beam B3 has a dimension D1 of about 8 mm which is about twice as large as dimension D2. Additionally, the dimension D1 (8 mm) is larger than the width of the leg 71 (4 mm). As a result of these relative dimensions, as shown in FIG. 4B, when the beam BH is pointed directly at leg 71, the beam BH is not entirely blocked by the leg 71. Instead, parts of the beam BH pass along either side of the leg 71. In contrast, in the comparative example of FIG. 4A, the beam BH' is entirely blocked when it is in the position BH2'. Furthermore, as shown in FIG. 4B, the gap G caused by the leg 71 does not increase in size the farther away beam BH is from the projector 103. Rather, the gap G stays the same size. Accordingly, the gap G is about 4 mm wide and does not vary depending upon how far the laser 10 is from a wall. That is, while the gap G' is approximately 2 feet at a distance of 100 feet, the gap G is approximately 4 mm at a distance of 100 feet. This allows the laser level 10 to create a line with significantly less significant discontinuities. As should be appreciated from the above description, FIG. 4B illustrates beam BH at only a single point in time, whereas FIG. 4A illustrates beam BH' at three different points in time as the projector is rotated.

As discussed above, the exemplary embodiment with the construction of FIGS. 3B and 4B will produce a horizontal line with less notable discontinuities. In the exemplary embodiment, the width D1 of the horizontal beam BH is 8 mm, which is about twice as large as a width of a leg 71. The dimension D1 may also be other sizes. For example, D1 may be 3 mm or more; 4 mm or more; 5 mm or more; 6 mm or more; 7 mm or more; 8 mm or more; 9 mm or more; 10 mm or more; 12 mm or more; 13 mm or more; 14 mm or more; 15 mm or more; 16 mm or more; 18 mm or more; or 20 mm or more.

As also, noted above, it may be advantageous to have a leg 71 with a robust width LW in order to provide a robust protective structure 70. In the exemplary embodiment, the legs 71 have a width LW of 4 mm where the beam BH contacts the legs 71. In various embodiments, the width of the leg 71 where the beam BH contacts the leg may be at least 3 mm; at least 4 mm; at least 5 mm; at least 6 mm; at least 7 mm; at least 8 mm; at least 9 mm; at least 10 mm; at least 11 mm; at least 12 mm; at least 13 mm; at least 14 mm or at least 15 mm.

As described above, having a beam BH with a width which is greater than the width of the leg 71 helps prevent discontinuities in a line produced by the laser 10. In the exemplary embodiment, the width D1 of the beam BH is about twice as large as the width of leg 71. In some embodiments, the width D1 may be, for example, at least 10% greater than the width of the leg 71; the width D1 may be at least 20% greater than the width of the leg 71; the width D1 may be at least 30% greater than the width of the leg 71; the width D1 may be at least 40% greater than the width of the leg 71; the width D1 may be at least 50% greater than the width of the leg 71; the width D1 may be at least 60% greater than the width of the leg 71; the width D1 may be at least 70% greater than the width of the leg 71; the width D1 may be at least 80% greater than the width of the leg 71; the width D1 may be at least 90% greater than the width of the leg 71; the width D1 may be at least 100% greater than the width of the leg 71; the width D1 may be at least 110% greater than the width of the leg 71; the width D1 may be at least 120% greater than the width of the leg 71; or the width D1 may be at least 150% greater than the width of the leg 71.

The expanded beam may be used with other rotary lasers and achieve similar benefits. For example, the configuration of FIGS. 3B and 4B may be used with the laser level 210 shown in FIGS. 6A and 6B. As shown in FIGS. 6A and 6B, the laser level 210 includes a housing 220, a projector 203 and a protective structure 270 with legs 271. In this case, the protective structure 270 has a pair of legs at each corner of the housing 220. As will be appreciated the rotary laser beam of the laser level 210 will likewise pass through the protective structure 270 with legs 271 and the features of the above-described embodiment of FIGS. 3B and 4B could be applied to minimize the disruption from the legs 271. Another exemplary embodiment is shown in FIG. 7. In the exemplary embodiment of FIG. 7, the laser level 310 has a housing 320, a projector 303 and a protective structure 370 with a plurality of legs 371. The features of the above-described embodiment of FIGS. 3B and 4B could likewise be applied to the laser level 310 to minimize the disruption from the legs 371.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A laser level, comprising:
   a housing;
   a laser generator assembly housed in the housing and generating a laser beam,
   a projector configured to project the beam from the laser generator outside of the housing onto a target surface;
   wherein the laser is a rotary laser and the projector rotates to rotate projection of the beam;
   the laser level further comprising at least one protective leg extending from the housing, the protective leg blocking projection of the beam along part of its path as the projector rotates;
   wherein a width of the beam is at least 20% greater than a width of the at least one protective leg where the beam contacts the at least one protective leg.

2. The laser level of claim 1, the at least one protective leg comprises two protective legs and the width of the beam is at least 30% greater than the width of each of the two protective legs where the beam contacts each of the two protective legs.

3. The laser level of claim 2, wherein the width of the beam is at least 40% greater than the width of each of the two protective legs where the beam contacts each of the two protective legs; and
   wherein the widths of each of the two protective legs where the beam contacts each of the two protective legs is at least 3 mm.

4. The laser level of claim 2, wherein the widths of each of the two protective legs where the beam contacts each of the two protective legs are at least 4 mm.

5. The laser level of claim 2, wherein the width of each of the two protective legs where the beam contacts each of the two protective legs are at least 5 mm.

6. The laser level of claim 2, wherein the width of each of the two protective legs where the beam contacts each of the two protective legs are at least 6 mm.

7. The laser level of claim 1, wherein the width of the beam is at least 30% greater than the width of the at least one protective leg where the beam contacts the at least one protective leg; and
   wherein the at least one protective leg has a width of at least 3 mm where the beam contacts the at least one protective leg.

8. The laser level of claim 1, wherein the laser beam has a perpendicular cross section which is a cross section taken perpendicular to an axis of the laser beam, the perpendicular cross section having a first dimension and a second dimension perpendicular to the first dimension, the first dimension of the cross section being at least 30% larger than the second dimension.

9. The laser level of claim 8, wherein the first dimension of the perpendicular cross section is at least 45% larger than the second dimension.

10. The laser level of claim 8, wherein the first dimension of the perpendicular cross section is at least 60% larger than the second dimension.

11. A laser level, comprising:
a housing;
a laser generator assembly housed in the housing and generating a laser beam;
a projector configured to project the beam from the laser generator outside of the housing;
a motor, the motor connected to the projector and selectively driving the projector in a rotary motion whereby the beam is rotated;
protective legs which protect the projector and are situated between the projector and a target surface along part of a path of the beam as the projector is rotated;
wherein a width of the beam is at least 25% greater than a width of the leg where the beam contacts the leg; and
wherein the width of the leg where the beam contacts the leg is at least 3 mm.

12. The laser level of claim 11, wherein the width of the beam is at least 30% greater than the width of the leg where the beam contacts the at least one protective leg.

13. The laser level of claim 11, wherein the width of the beam is at least 50% greater than the width of the leg where the beam contacts the at least one protective leg.

14. The laser level of claim 11, wherein the laser beam has a perpendicular cross section with a first dimension and a second dimension perpendicular to the first dimension, the first dimension of the cross section being at least 20% larger than the second dimension.

15. The laser level of claim 14, wherein the first dimension of the perpendicular cross section is at least 50% larger than the second dimension.

16. A laser level, comprising:
a housing;
a laser generator assembly housed in the housing and generating a laser beam;
a projector configured to project the beam from the laser generator outside of the housing;
a motor, the motor connected to the projector and selectively driving the projector in a rotary motion whereby the beam is rotated;
protective legs which protect the projector and are situated between the projector and a target surface along part of a path of the beam as the projector is rotated;
wherein the laser beam has a perpendicular cross section which is a cross section taken perpendicular to an axis of the laser beam, the perpendicular cross section having a first dimension and a second dimension perpendicular to the first dimension, the first dimension of the cross section being at least 20% larger than the second dimension.

17. The laser level of claim 16, wherein the first dimension is at least 35% larger than the second dimension.

18. The laser level of claim 16, wherein the first dimension is at least 50% larger than the second dimension.

19. The laser level of claim 16, wherein the first dimension is at least 75% larger than the second dimension.

20. The laser level of claim 16, wherein the protective legs comprise three protective legs; and
wherein a width of the beam is at least 30% greater than a width of each the three protective legs where the beam contacts each of the three protective legs; and
wherein the width of each of the three protective legs where the beam contacts each of the three protective legs is at least 4 mm.

* * * * *